O. M. DORSEY.
FLY OR OTHER INSECT TRAP.
APPLICATION FILED MAY 17, 1920.
1,371,200.
Patented Mar. 8, 1921.
3 SHEETS—SHEET 1.
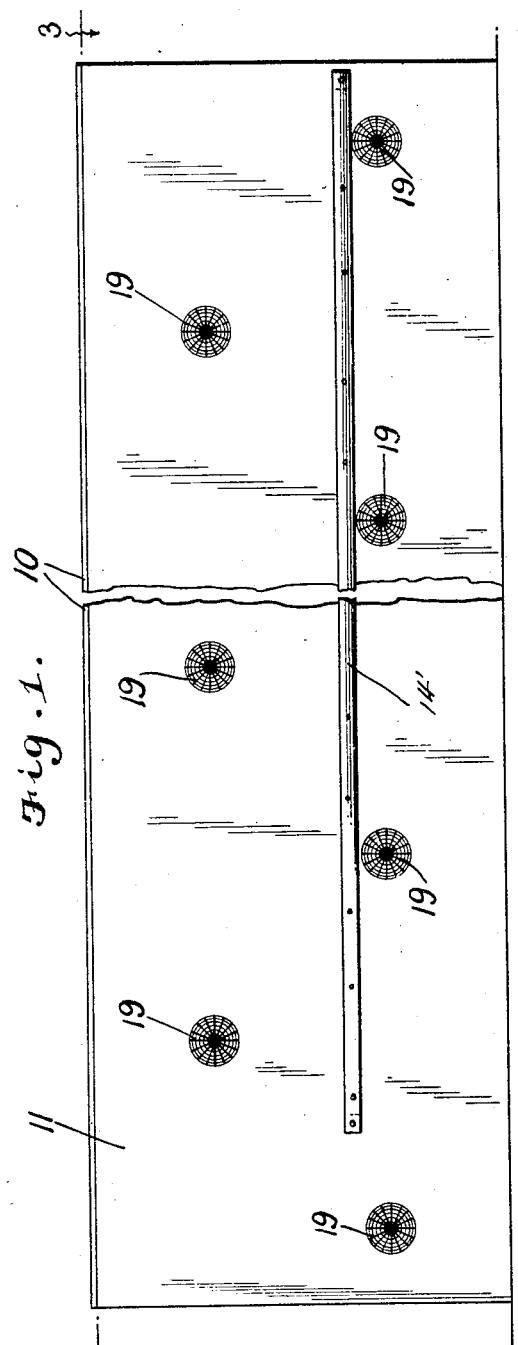
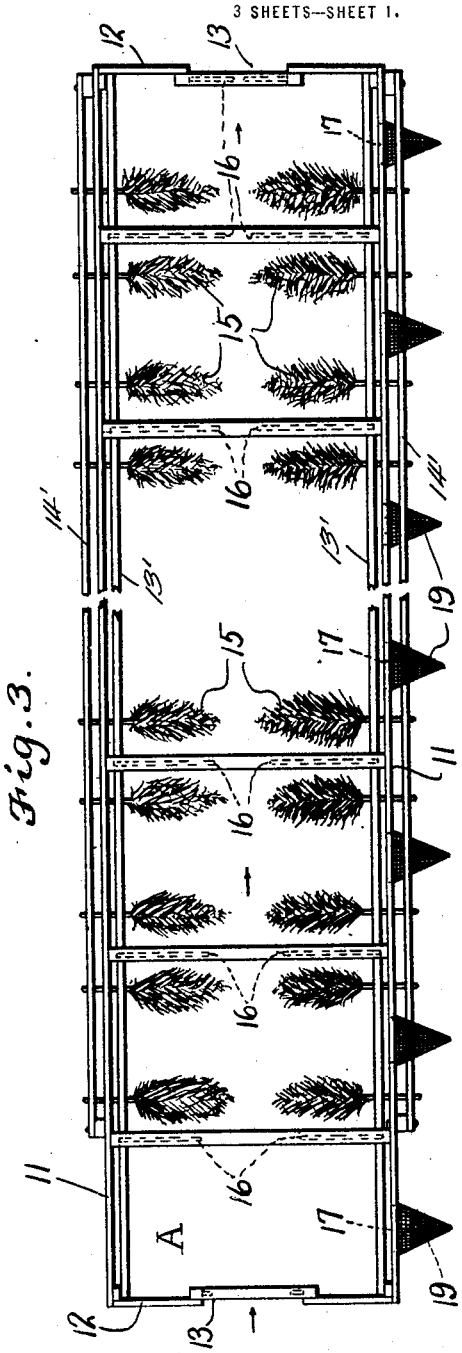
O. M. Dorsey INVENTOR
BY
ATTORNEY
WITNESS:

O. M. DORSEY.
FLY OR OTHER INSECT TRAP.
APPLICATION FILED MAY 17, 1920.
1,371,200.
Patented Mar. 8, 1921.
3 SHEETS—SHEET 2.
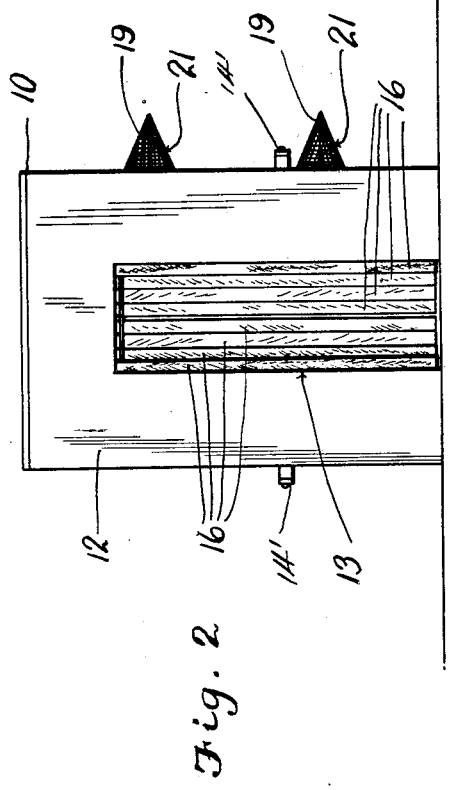
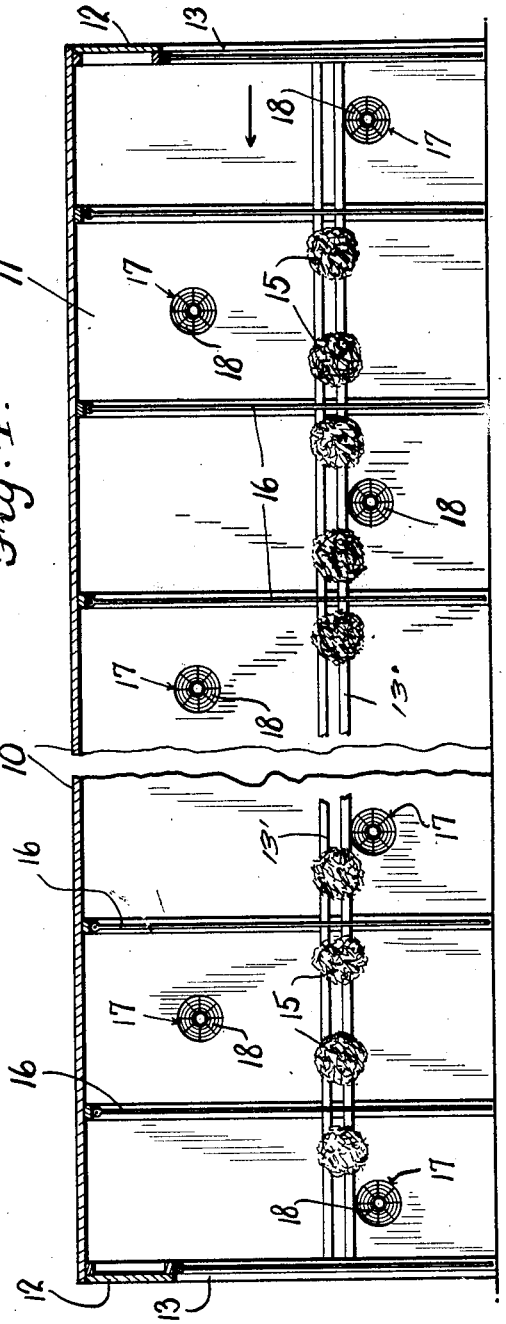
O. M. Dorsey INVENTOR

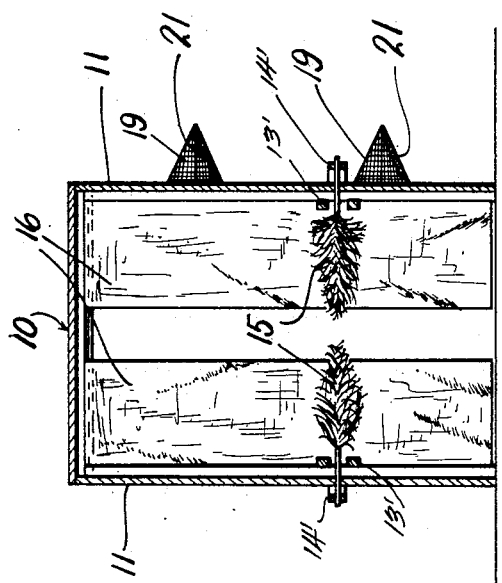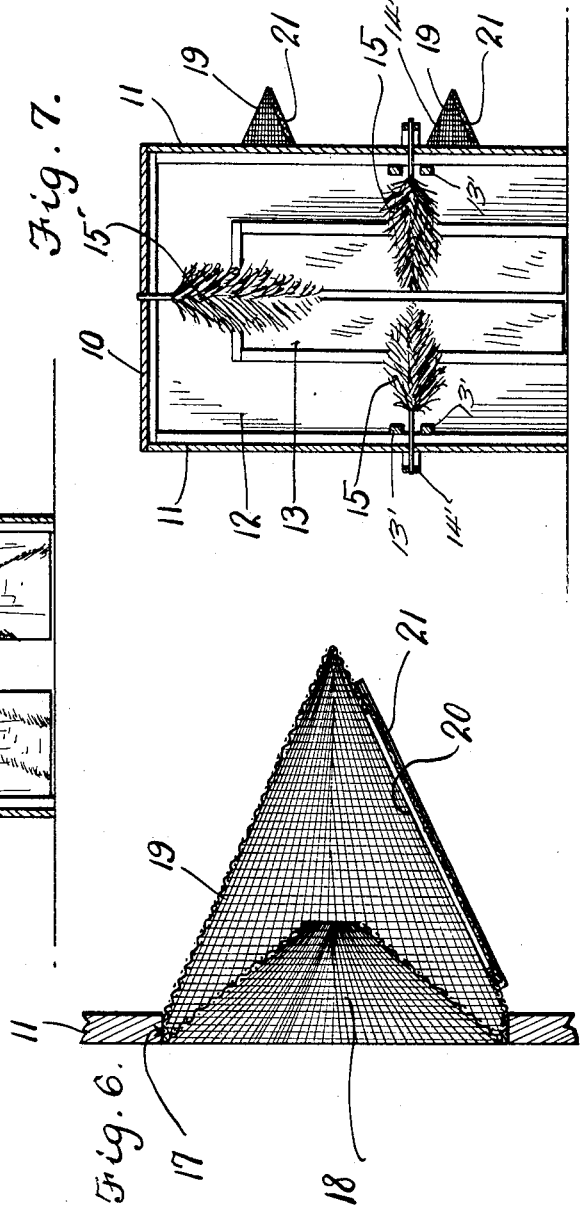

UNITED STATES PATENT OFFICE.

OREN MAYO DORSEY, OF POLLOCK, LOUISIANA.

FLY OR OTHER INSECT TRAP.

1,371,200.   Specification of Letters Patent.   Patented Mar. 8, 1921.

Application filed May 17, 1920. Serial No. 381,974.

*To all whom it may concern:*

Be it known that I, OREN MAYO DORSEY, a citizen of the United States, residing at Pollock, in the parish of Grant and State of Louisiana, have invented new and useful Improvements in Fly or other Insect Traps, of which the following is a specification.

This invention comprehends the provision of an apparatus designed for removing from animals flies or other insects and subsequently trapping said insects.

Most specifically stated, the invention provides a tunnel like structure through which the animals are adapted to pass, the interior of the structure being equipped with means for brushing and removing the flies or other insects from the body of the animal, the interior of the structure being darkened except for a few openings through which the flies or insects endeavor to escape, the openings leading into suitable traps for said flies and insects.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:—

Figure 1 is a side elevation of the apparatus forming the subject matter of my invention.

Fig. 2 is an end elevation.

Fig. 3 is a horizontal sectional view taken through the apparatus.

Fig. 4 is a vertical longitudinal sectional view therethrough.

Fig. 5 is a transverse sectional view.

Fig. 6 is a fragmentary view of one of the traps.

Fig. 7 is a fragmentary view of a modified form of the invention.

The apparatus forming the subject matter of my invention embodies a tunnel like member indicated generally at A, and including a top 10, side walls 11 and end walls 12, each of the end walls being provided with openings 13, it being understood that the animal enters the tunnel at one end and leaves by the other end. The tunnel may be of any suitable size and may also vary in cross sectional configuration, but is constructed from non-transparent material so as to provide for darkness within the tunnel A. Arranged within the member and secured to each side wall 11 is a pair of spaced reinforcing strips 13' which extend longitudinally of the wall, while arranged exteriorly of each side wall is an additional reinforcing strip 14'. Projecting from the opposed side walls 11 of the tunnel are suitable brushes 15 which terminate short of the longitudinal center of the tunnel, these brushes being spaced an appreciable distance from the ground and properly located to brush against the lower part of the body of the animal as well as the legs of the animal for the purpose of removing the flies or other insects as the animal passes through the tunnel. Each brush 15 includes a handle which passes between the strips 13' through the adjacent side wall of the member A and is connected to the reinforcing strip 14' which supports the brushes.

Depending from the top 10 of the tunnel are curtains 16, these curtains being spaced apart throughout the entire length of the tunnel. Each curtain includes two sections which may be drawn toward each other, while the curtains are of such construction and size as to contact the upper part of the body of the animal with a view of removing the flies or insects therefrom as the animal passes through the tunnel. Instead of using the curtains above mentioned, this may be made of brushes 15' which depend from the top of the tunnel like member as shown in Fig. 7. These brushes are of sufficient size and disposed relatively to remove flies or other insects from the upper part of the body of the animal walking through the tunnel. If desired, both brushes and curtains may be used, suspended from the top of the tunnel like member for the purpose stated.

As above stated it is intended to keep the interior of the tunnel darkened, and consequently the tunnel is free of light openings except for the few openings 17 arranged at spaced intervals along one side 11 of the tunnel. These openings are very small however and lead into traps which project from this side of the tunnel as is clearly shown. Each trap is made up of a plurality of foraminated cone shaped members 18 and 19 respectively, the member 18 being smaller than the member 19 and fitted within the latter.

The member 18 of each trap opens into the member 19, the latter in reality forming the trapping compartment. This member 19 is provided with an opening 20 through which the insects may be removed, the opening being normally closed by a sliding door or closure 21.

In practice, the animals singly enter the tunnel at one end, and pass out through the opposite end thereof. The sections of the curtain 16 adjacent the entrance opening are spaced an appreciable distance apart, this distance between the respective sections of the other curtains in successive order being slightly decreased so that the curtain most remote from the entrance opening has its sections practically brought together. As the animal passes through the tunnel, the brushes projecting inwardly from the opposed sides 11 coöperate with the sections of the curtains 16 contacting all parts of the body of the animal for the purpose of removing the flies or insects therefrom. When the insects have been removed from the body of the animal, they fly in the direction of the light openings in the side 11, and in their effort to escape through the openings they enter the trap. The insects are passed through the inner members 18 of each trap, but the opening of this member is so restricted that the flies cannot return through the opening into the tunnel A. Consequently the flies or insects are trapped in the members 19, in which they may be killed by holding a torch of any suitable character adjacent the trap. The insects when killed may be readily and easily removed from the trap by opening the sliding closure 21.

While it is believed that from the foregoing description the nature and advantages of the invention will be readily understood, I desire to have it known that I do not limit myself to the details herein shown and described, and that such changes may be resorted to when desired as fall within the scope of what is claimed.

What is claimed is:—

1. An apparatus of the character described comprising a tunnel shaped member, spaced reinforcing strips arranged on the opposed sides of the member and spaced therefrom, brushes projecting inwardly from the opposed sides of said member and including handles passed through the side members and also through the reinforcing strips and supported by the latter, curtains depending from the top of said member and spaced apart, and traps carried by one side of the member and communicating with the interior thereof.

2. An apparatus of the character described comprising a tunnel shaped member, brushes projecting inwardly from the opposed sides of the member and including handles, reinforcing strips arranged longitudinally of the member and spaced therefrom, the handles of the brushes being passed through the walls of the member, supported by the reinforcing strips, curtains depending from the tops of the member and spaced apart, trapping elements carried by one side of the member and communicating with the interior thereof, each element having an exit opening, and a sliding closure for said opening.

In testimony whereof I affix my signature.

OREN MAYO DORSEY.